(12) United States Patent
Brown et al.

(10) Patent No.: US 7,257,709 B2
(45) Date of Patent: Aug. 14, 2007

(54) METHOD AND APPARATUS FOR PERFORMING VALIDATION OF ELLIPTIC CURVE PUBLIC KEYS

(75) Inventors: Daniel R. L. Brown, Waterloo (CA); Atsushi Yamada, Toronto (CA)

(73) Assignee: Certicom Corp., Mississauga (CA)

( * ) Notice: Subject to any disclaimer, the term of this patent is extended or adjusted under 35 U.S.C. 154(b) by 760 days.

(21) Appl. No.: 10/653,206

(22) Filed: Sep. 3, 2003

(65) Prior Publication Data
US 2004/0114760 A1 Jun. 17, 2004

Related U.S. Application Data

(60) Provisional application No. 60/407,301, filed on Sep. 3, 2002.

(51) Int. Cl.
*G06F 9/00* (2006.01)

(52) U.S. Cl. ............... 713/171; 713/165; 713/166; 713/167; 713/168

(58) Field of Classification Search ................ 713/171, 713/165, 166, 167, 168
See application file for complete search history.

(56) References Cited

U.S. PATENT DOCUMENTS 5,159,632 A * 10/1992 Crandall ................... 380/28
5,272,755 A * 12/1993 Miyaji et al. .............. 380/30

OTHER PUBLICATIONS

Smart, N.P., The Exact Security of ECIES in the Generic Group Model, Cryptography and Coding, LNCS 2260, Dec. 2001, pp. 73-84.

* cited by examiner

*Primary Examiner*—Thomas R. Peeso
(74) *Attorney, Agent, or Firm*—John R. S. Orange; Brett J. Slaney; Blake, Cassels, Graydon LLP

(57) ABSTRACT

A method of validating a public key comprising the steps of receiving a public key, computing a function of the public key, the function having a predefined value for all points of a given order, and comparing the result of the function to predetermined information to indicate the validity of the public key.

17 Claims, 3 Drawing Sheets

METHOD AND APPARATUS FOR PERFORMING VALIDATION OF ELLIPTIC CURVE PUBLIC KEYS

This application claims priority from U.S. application No. 60/407,301 filed on Sep. 3, 2002, the contents of which are incorporated herein by reference.

BACKGROUND

1. Field of the Invention

This application relates to a method and apparatus for performing validation of elliptic curve public keys.

2. Description of the Prior Art

Cryptography is an essential tool in information security. It allows two correspondents to communicate secretly and/or authentically over a public channel. Private key systems require a secret to be shared beforehand by the correspondents. Such key distribution is often as difficult as the initial problem of secret communication, since the secret key must be transferred over a secure channel.

Public key cryptography helps solve the otherwise intractable problem of key distribution in cryptography. Without public key cryptography, the difficulty of key distribution is so high that securing information is impractical for all but those with the most extensive resources. Elliptic curve cryptography is a very efficient variety of public key cryptography, which is highly suitable for a wide variety of constrained environments. Other well-known varieties of public key cryptography include RSA and (ordinary) Diffie-Hellman.

Public key validation involves making sure that the public keys have the requisite properties, which ensures that no security compromises result from processing invalid public keys. For elliptic curve cryptography, some of the security compromises that can result from processing invalid public keys include small subgroup attacks and invalid-curve attacks.

Elliptic curve public key validation comes in two varieties, as set forth in the standards ANSI X9.62 and ANSI X9.63, namely partial validation and full validation. Elliptic curve public keys are elliptic curve points, and for a given set of elliptic curve domain parameters, a given point can be either valid or not valid. Elliptic curve domain parameters consist of a finite field size q together with a given representation FR of field elements, coefficients a and b of the elliptic curve equation, a prime number n, a cofactor h, and a base point or generator G. Suppose that Q is purported to be a valid elliptic curve point for domain parameters (q, FR, a, b, n, h, G). The point Q is fully valid if the following four conditions are met:

1. Q is not 0, the point at infinity (also known as the identity, zero or neutral element of the elliptic curve);
2. Q=(x, y) where x and y are valid elements of the finite field of size q for the given field representation FR;
3. E (x, y)=0, where E is given by the equation for the elliptic curve. For prime q>3, this means that $y^2=x^3+ax+b$, and for even q, this means that $y^2+xy=x^3+ax^2+b$;
4. nQ=0, where, nQ means Q added n times to 0, called a scalar multiple of Q.

If the first three conditions hold, then Q is said to be partially valid.

The straightforward way to check condition 4 is to do scalar multiplication. However, scalar multiplication is a computationally intensive step of elliptic curve cryptography. The computation cost of typical operations in elliptic curve cryptography, such as signing, verifying, encrypting and decrypting, is roughly equal to somewhere between one to one-and-a-half scalar multiplications. Therefore, full validation, at least using the straightforward methods, roughly doubles the computational cost. In practice, therefore alternate techniques are used to thwart some of the attacks, such as small subgroup attacks, that full validation seeks to prevent.

Some elliptic curve cryptographic schemes use the so-called cofactor method. Here the public key Q is scalar multiplied by h before further use. Then n(hQ)=0, which prevents many types of small subgroup attacks. In such cases, partial validation of Q suffices to prevent these attacks. For the small h values typically used, such as 1,2 and 4, the cofactor method is much more efficient than the straightforward method of doing full validation, because computing hQ for small h is much faster than computing nQ since n is a large prime.

Another method is the so-called compatible cofactor method, which is first scalar multiplying Q by h, as above, getting a result hQ so that n(hQ)=0, and then scalar multiplying by $h^{-1}$ mod n. If Q has order n to begin with, the result of these two steps is Q itself, and thus the term compatible. If Q does not have order n, the result of the operations has order n but is different from Q. Generally, the compatible cofactor method requires computing a full scalar multiplication so is no more efficient than the obvious method of doing full validation.

It should be noted that when the cofactor h=1, partial validation and full validation are equivalent. That is, when h=1 no extra steps are necessary beyond those in partial validation to accomplish full validation.

The known small subgroups attacks that full validation thwarts compromise $\log_2(h)$ bits of elliptic curve private keys. There may, however, be more damaging attacks exploiting not fully validated elliptic curve points, which are as yet undiscovered. As a precaution, therefore, full validation is highly recommended, wherever possible. A common practice, however, has been to use partial validation. When partial validation is not supplemented by one of the alternate techniques above, such as the cofactor method, the known attacks reduce the security by $\log_2(h)/2$ bits, and the unknown attacks might reduce it by more.

It is an object of the present invention to obviate or mitigate some of the above disadvantages.

SUMMARY OF THE INVENTION

In one aspect, the inventors have recognized that efficient tests may be made on purported public keys in order to achieve full or nearly full validation of public keys. These tests use functions of the public key which are efficiently computable and provide information on the order of the elliptic curve point representing the public key. The functions have a predefined value for all points of a given order. Embodiments of the invention use the trace function and/or the half trace function. The trace function Tr(x) and half trace function Hf(x) are linear, that is Tr(x+y)=Tr(x)+Tr(y). In addition, the trace function has the property that $Tr(x^2)=Tr(x)$. The half-trace function has the property that $Hf(x^2)+Hf(x)=x+Tr(x)$.

The inventors have recognised that for elliptic curves over binary fields having cofactor h=2, full validation can be performed by checking that Tr(x)=1.

The inventors have recognised that for elliptic curves over binary fields having cofactor h=4, full validation can be performed as follows: (i) check that Tr(x)=0, (ii) check that x does not equal 0, and (iii) check that $Tr(x \, Hf(b/x^2))=0$. In a preferred embodiment, the curve is a Koblitz curve and the coefficient b is 1 so condition (iii) is $Tr(xHf(1/x^2))=0$.

In another aspect, the inventors have recognised that nearly full validation can be achieved by comparing Q with a predetermined list of the points whose order divides h. For typical values of h, such as 1, 2 or 4, this list consists of h points, one of which is 0 and is already compared with Q as part of partial validation. A disadvantage of this method is that it does not achieve full validation, so does not eliminate all possible small subgroup attacks. This method is said to achieve nearly full validation.

According to one aspect of the present invention, there is provided a method of validating a public key. The method comprises first receiving a purported public key, then computing a function of the public key, where the function has a predefined value for all points of a given order. The result of the function is compared to predetermined information to indicate the validity of the public key. When the public key is determined valid or nearly valid, it is used in subsequent cryptographic operations.

In one embodiment, the predetermined information is a list of points whose order divides a cofactor h.

In another embodiment, the predetermined information is that for an elliptic curve over a binary field with cofactor h=2, a point Q=(xy) order n if and only if $Tr(x)=1$.

In a further embodiment, the predetermined information is that for an elliptic curve over a binary field with cofactor h=4, a point Q=(x,y) order n if and only if $Tr(x)=0$, x is not equal to 0, and $Tr(x\ Hf(b/x^2))=0$.

According to another aspect of the present invention, there is provided a method of validating a point on an elliptic curve defined over a finite field and with order an odd prime times a power of two comprising the steps of partially validating the point, attempting to halve the point repeatedly until either no half is found, or the number of times the point is halved is the exponent of two in the power of two; and accepting the point if the point is partially valid and the number of times is equal to the exponent.

According to another aspect of the invention, there is provided a method of validating a point on an elliptic curve with a known cofactor, comprising the steps of determining factors of the cofactor; determining the possibility of scalar division of the point by each of the factors; and rejecting the point if any of the scalar divisions is not possible.

According to yet another aspect of the invention, there is provided a method of nearly fully validating a point on an elliptic curve with a given cofactor comprising the steps of partially validating the point finding the scalar multiple of the point to the cofactor; and accepting the point if the point is partially valid and the scalar multiple is the zero element of the elliptic curve.

According to a further aspect of the present invention, there is provided a method of nearly fully validating a point on an elliptic curve with a known cofactor comprising partially validating the point and confirming that the point does not equal each member of a set of predetermined points.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
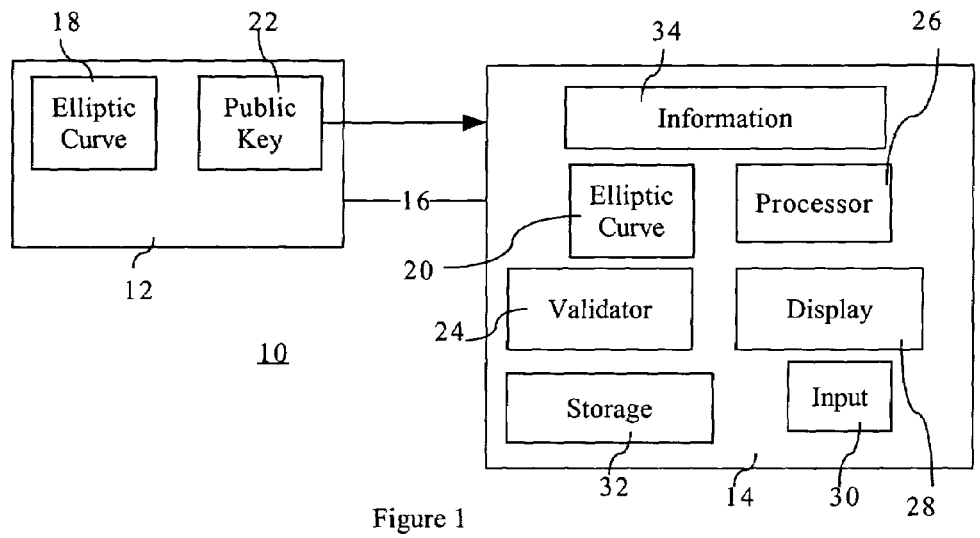
FIG. 1 is a schematic view of a communication system.

Referring to FIG. 1, a communication system is shown generally by the numeral 10. The communication system 10 includes two correspondents 12, 14, which may be cryptographic tokens such as smart cards, pagers, and cell phones, or personal computers and/or laptops. The two correspondents 12, 14, exchange messages over a communication channel 16. The communication channel 16 provides protocols for reliable communications but no provision for secrecy. Transmissions over the communication channel 16 may be monitored by an adversary or eavesdroppers. To secure their communications, the correspondents use respective elliptic curve modules 18, 20 which implement an elliptic curve cryptosystem. The messages can include an elliptic curve public key 22 sent from the correspondent 12 to the correspondent 14. The correspondent 14 has a validator 24 to verify the integrity of received elliptic curve public keys. The correspondent 14 can include a processor 26. The processor 26 is coupled to a display 28 and to user input devices 30, such as a keyboard, keypad, mouse, stylus or other suitable devices. If the display 28 is touch sensitive, then the display 28 itself can be employed as the user input device 30. A computer readable storage medium 32 is coupled to the processor 26 for providing instructions to the processor 26 to instruct and/or configure the elliptic curve cryptography module 20 and validator 24. The computer readable medium 32 can include hardware and/or software such as, by way of example only, magnetic disks, magnetic tape, optically readable medium such as CD ROMs, and semi-conductor memory such as PCMCIA cards. In each case, the medium 32 may take the form of a removable item such as a small disk, floppy diskette, cassette, memory card, or it may take the form of a relatively immobile item such as hard disk drive, solid state memory card, or RAM provided in the correspondent 14. It should be noted that the above listed example media 32 can be used either alone or in combination.

It will be recognized that the correspondent 12 may have similar structure to the correspondent 14. Alternatively the correspondent 12 may use alternate components to perform similar functions. Correspondent 12 sends an elliptic curve public key to the correspondent 14. It will be understood that operation of the correspondent 14 does not depend on the details of how the correspondent 12 operates, or what hardware and/or software is used by correspondent 12.

The correspondent 14 has predetermined information 34 for identifying valid public keys. The predetermined information 34 is stored in the correspondent 14 and allows the correspondent 14 to determine whether a public key is valid. In various embodiments, the predetermined information 34 includes a listing of public keys having small order, the result of a function of certain public keys, and the trace of public keys having order n.

Figure 2:
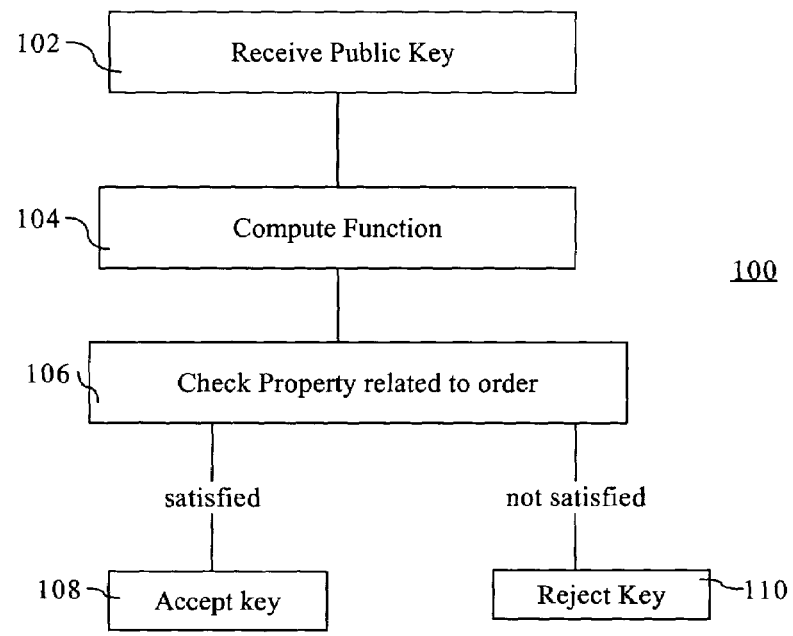
FIG. 2 is a method performed by correspondents of FIG. 1.

Referring to FIG. 2, a method performed by the correspondent 14 upon receipt of the elliptic curve public key of correspondent 12 is shown generally by the numeral 100. Correspondent 14 first receives the public key from correspondent 12 at step 102. Correspondent 14 then applies a function to the public key to obtain a value at step 104. The value of the function provides an easily tested characteristic of the public key dependent upon its order. The correspondent 14 then uses the value to check that the order is acceptable at step 106. If the order is acceptable, then the key is accepted at step 108. If the order is not acceptable, then the key is rejected at step 110.

Figure 3:
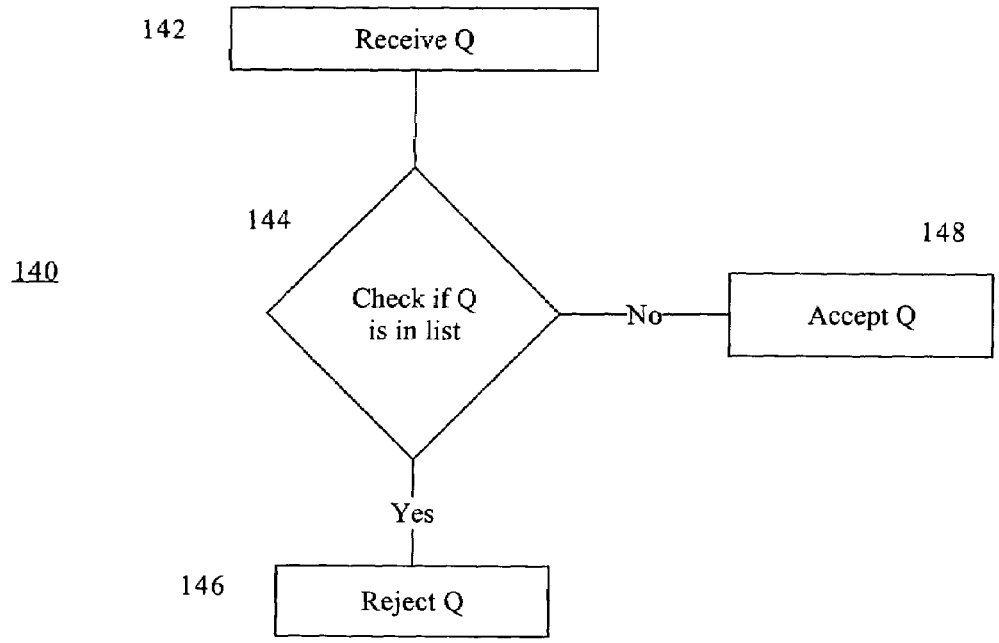
FIG. 3 is yet another method performed by correspondents of FIG. 1.

In a first embodiment, nearly full validation is achieved by comparing Q with a predetermined list of the points on the elliptic curve whose order divides h. This list is prepared in advance from the parameters of the elliptic curve and forms part of the predetermined information 34 stored by correspondent 14. For typical values of h, such as 1, 2 or 4, this list consists of h points, one of which is 0 and is already compared with Q as part of partial validation. Referring therefore to FIG. 3, a method of validation using the predetermined list of points is shown generally by the numeral 140. The correspondent first receives Q at step 142. The correspondent then checks whether Q is in the predetermined list of points at step 144. If Q is in the list, then the correspondent rejects the public key at step 146. Otherwise, the correspondent accepts the public key at step 148. A disadvantage of this method is that it does not achieve full validation, so does not eliminate all possible small subgroup attacks. This method could be said to achieve nearly full validation.

A further embodiment makes use of some particularly expedient functions, namely trace and half-trace functions. These functions are useful for binary fields, which are the most widely used non-prime fields in elliptic curve cryptography. For binary fields, the field size q is a power of two, say $q=2^m$, with m almost invariably an odd number. For such q the trace function takes on the value 0 or 1 and is defined as $Tr(x)=x+x^2+x^4+ \ldots +x^{2^{m-1}}$. The trace function has the useful properties that $Tr(x+y)=Tr(x)+Tr(y)$ and $Tr(x^2)=Tr(x)$. Various methods of computing the trace function are known, and some exemplary methods are discussed below.

The half-trace function produces a result in the finite field rather than the 0 or 1 produced by the trace function, and is defined as $Hf(x)=x+x^4+x^{16}+ \ldots +x^{4^{(m-1)/2}}$, provided that m is odd. The half-trace function has the useful property that $Hf(x+y)=Hf(x)+Hf(y)$ and $Hf(x^2)+Hf(x)=x+Tr(x)$. In particular, if the quadratic equation $z^2+z=a$ for z has a solution, the solutions are $z=Hf(a)$ and $z=Hf(a)+1$. Also, the equation has a solution if and only if $Tr(a)=0$. Methods of computing the half-trace function are similar to methods of computing the trace function, and some will be discussed below.

This embodiment applies to elliptic curves that are defined over binary fields and that have cofactors h=2 and h=4. (When h=1, full validation may be accomplished simply by performing partial validation. However, no elliptic curves over binary fields have cofactor h=1, so some method is always needed over binary fields to accomplish full validation or its effects.)

The inventors have recognised that curves with such cofactors h=2 and h=4 allow particularly expedient methods of validating a public key. These methods use a technique of determining whether a public key has a "half" to partially determine the order of the public key. A point R such that Q=2R is called a half of Q. The general check to determine whether a point Q=(x, y) has a half is to check that $Tr(x)=Tr(a)$ where the elliptic curve equation is $y^2+xy=x^3+ax^2+b$ over a binary field. If the cofactor h=2, then $Tr(a)=1$. If the cofactor h=4, then $Tr(a)=0$.

The inventors have recognised that checking $Tr(x)=Tr(a)$ is one of the most efficient way to check that the a point Q=(x, y) on the curve is of the form Q=2R for some other point R on the curve. Computing Tr(x) is much faster than computing nQ by conventional scalar multiplication, therefore this check is much faster than the conventional methods of full validation. This method can be accelerated further by using a fast method of computing Tr(x), where only a dot product between x and a fixed vector is performed.

When the cofactor h=2, the elliptic curve has 2n points, where n is a large prime. The only possible order for the point Q is 1, 2, n, or 2n. Partial key validation includes a check that Q does not have order 1, so the only remaining possible orders for Q are 2, n and 2n. For these orders, Q has a half if and only if Q has order n since if the point Q has order 2n or 2, then it has no halves. If desired, a half of Q may be found, but it is not necessary to find such a half to confirm that the order is n. It is noted that if the point Q has order 1 then is has one half, but that such points will be eliminated by the above check that Q does not have order 1.

Figure 4:
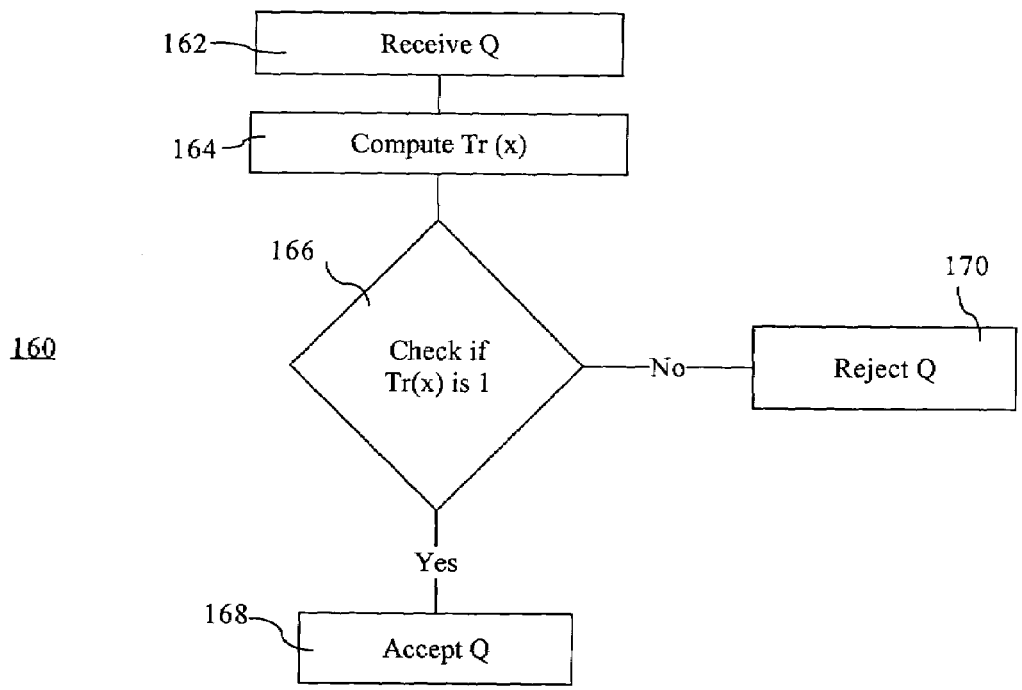
FIG. 4 is still another method performed by correspondents of FIG. 1.

Referring therefore to FIG. 4, the second embodiment of the method for a curve with cofactor h=2 is shown generally by the numeral 160. The correspondent first receives Q at step 162. Then, the correspondent computes Tr(x) at step 164. The correspondent then checks at step 166 whether Tr(x) is 1. If so, then the correspondent accepts Q at step 168. Otherwise, the correspondent rejects Q.

When the cofactor h=4, the elliptic curve has 4n points, where n is a large prime. The possible orders for a public key Q are 1, 2, 4, n, 2n, and 4n. Again, partial key validation eliminates the possibility of a key of order 1. Points of orders 1, 2, n, and 2n have halves of order 2, 4, 2n, and 4n respectively. Furthermore, points of orders 1 and n have quarters (i.e. halves of halves) of order 4 and 4n respectively. The inventors have therefore recognized that points of order n are those which have both halves and quarters. Points of order 2 also satisfy this condition, and the so the inventors have recognized that a further check for points of order 2 is necessary.

Figure 5:
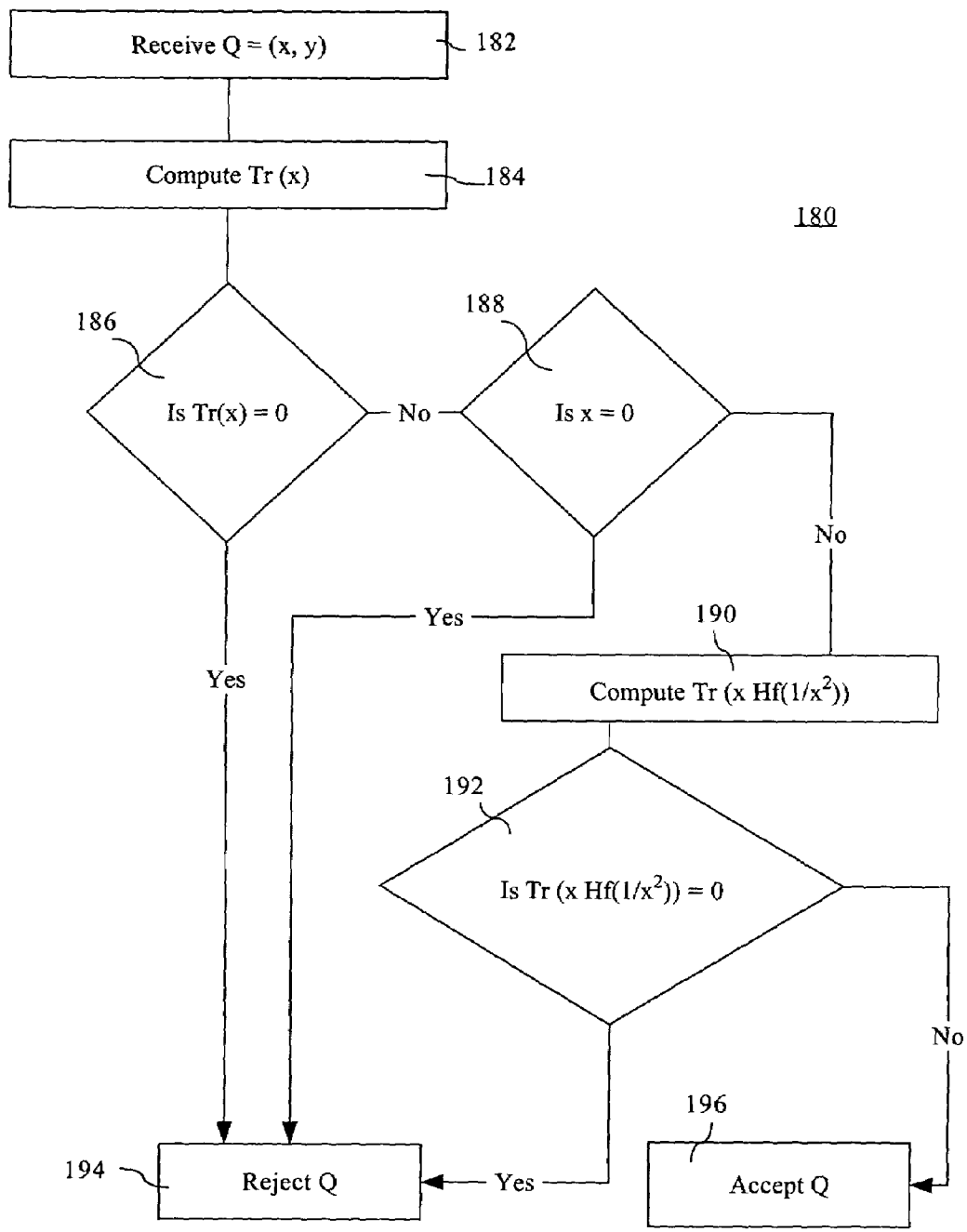
FIG. 5 is a further method performed by correspondents of FIG. 1.

Referring to FIG. 5, a method for cofactor h=4 is shown generally by the numeral 180. The preferred method to check nQ=0 for a point Q=(x, y) on the elliptic curve is as follows:

Check that $Tr(x)=0$,
Check that x does not equal 0, and
Check that $Tr(x\ Hf(b/x^2))=0$.

Referring therefore to FIG. 5, the correspondent first receives the public key Q=(x, y). The correspondent then computes Tr(x) at step 184. The correspondent then checks if Tr(x)=0. If Tr(x) is not 0, then the correspondent rejects Q at step 194. When Tr(x)=0, the correspondent then proceeds to test if x=0 at step 188. If so, then the correspondent rejects Q at step 194. Otherwise, the correspondent computes Tr(x Hf(b/x²)). If this trace is not 0, then the correspondent rejects Q at step 14. Otherwise, the correspondent accepts the public key Q at step 196.

The first step above, Step (a), namely that Tr(x)=0, confirms that Q has a half, which is a point R such that 2R=Q. It will be recognised that step (a) above and the h=2 test may be unified into a single check that Tr(x)=Tr(a), or equivalently that Tr(x+a)=0. Step (a) is very fast but can be made even faster by using the dot product method of calculating the trace.

The second step above, Step (b), namely that x is not zero, confirms that Q=(x, y) is not a point of order 2. For cofactor h=4, points of order 2 can have halves, namely points of order 4. Thus Step (a) alone is not guaranteed to eliminate the undesirable points of order 2, which explains why Step (b) is needed. The order of Step (a) and Step (b) may be swapped without significance, if desired.

The third step above, Step (c), namely that $Tr(x\ Hf(b/x^2))=0$, confirms that the point $Q=(x, y)$ has a quarter, which is a point P such that $4P=Q$. The following explains why this test works.

Suppose the cofactor h is 4. If $R=(u, v)$ is half of $Q=(x, y)$, so that $2R=Q$, then Q has a quarter if and only if R has a half. A test for R having a half is $Tr(u)=0$. To apply this test to Q, we must solve for u in terms of $Q=(x, y)$. The doubling formula for elliptic curves gives $x=t^2+t+a$ where $t=u+v/u$. Solving for v in the latter equation gives $v=u^2+tu$. Now, because $R=(u, v)$ is on the curve, we have the equation $v+uv=u^3+au^2+b$, into which we can substitute the formula for v. This simplifies to the equation $u^4+(t^2+t+a)u^2+b=0$. Replacing the second coefficient by x (from the doubling formula above) gives $u^4+xu^2+b=0$. Divide this by $x^2$ to get the equation $(u^2/x)^2+u^2/x+b/x^2=0$. Use the half-trace to solve $u^2/x=Hf(b/x^2)$ which is a valid solution because $Tr(b/x^2)=0+Tr(b/x^2)=Tr(x+a)+Tr(b/x^2)=Tr(x+a+b/x^2)=Tr((x^3+ax^2+b)/x^2)=Tr((y^2+xy)x^2)=Tr((y^2/x^2)^2+y^2/x)=0$ according to the properties of the trace function. Thus $u=(xHf(b/x^2))^{1/2}$. Now $Tr(u)=Tr(u^2)$ because of the properties of the trace function, so $Tr(u)=Tr(xHf(b/x^2))$.

This step is a more complicated step than the former two because it involves a field multiplication, a field inversion and a half-trace evaluation, but is still much faster than the conventional scalar point multiplication, which involves hundreds of field multiplications and at least a few field inversions. A variant of Step (c) is to compute the half point R of Q, and then to check whether or not R has a half point. Because this step requires an inversion, it cannot be done before the previous step, Step (b), since only that step ensures that inversion of zero does not happen.

Alternately, Step (b) can be absorbed in the third step, because if $x=0$, then the third step will generate a division by zero error. In this sense, the second step above is implicit in the third step above. Step (a) can be performed after or before Step (c) without harm.

Step (c) alone, in particular without Step (a), will not ensure a point $Q=(x, y)$ has order n. The expression $Tr(x\ Hf(b/x^2))$ takes values 0 and 1, with roughly equal probably for valid points Q on the curve. Thus Step (c) only eliminates about half the points on the curve. But only about one quarter of the points have order n, so Step (c) will not eliminate all the points needed. In particular, Step (c) is only reliable for checking that Q has a quarter if Q has a half. If Q does not have a half, then it is certainly does not have a quarter, and passing Step (c) does not ensure that it has a quarter.

The trace and half-trace functions may each be computed fairly quickly with roughly m squaring operations in the finite field, with a similar number of add operations although these are generally far cheaper. Compared to the cost of an elliptic curve scalar multiplication, which typically uses hundreds of field multiplications, this is very fast. Moreover, even faster ways to evaluate the trace and half-trace functions are known, because these functions are linear over the binary field of size 2.

The trace function only requires evaluation of a dot product of two vectors of dimension m over the binary field of size 2. One vector is the representation of x in a basis and the other vector is a predetermined constant. Suppose x is written as a binary vector $x=(x_1, x_2, \ldots, x_m)$ in the basis $(B_1, B_2, \ldots, B_m)$ so that $x=x_1B_1+x_2B_2+\ldots x_mB_m$ as a field element. Then $Tr(x)=Tr(x_1B_1+x_2B_2+\ldots x_mB_m)=x_1Tr(B_1)+x_2Tr(B_2)+\ldots +x_mTr(B_m)$ since the trace function is linear and each $x_i$ is either 0 or 1. The predetermined vector is determined by evaluating the traces corresponding to each basis element. For example, $v=(Tr(B_1), Tr(B_2), \ldots, Tr(B_m))$. Then $Tr(x)=x\cdot v$, that is the dot product of x and the predetermined vector v. Each coordinate of the predetermined vector is the trace of the corresponding basis element. The dot product may be computed on a machine as an "and" or "masking" operation, followed by determining the parity of the total number bits in the resulting vector, which can be done by cyclic shifting of binary register. With this method, evaluation of a trace is about as fast as single multiply operation in the field.

The half-trace function can be computed by multiplying the vector form of x by a predetermined matrix M. Suppose x is written as a binary vector $x=(x_1, x_2, \ldots, x_m)$ in the basis $(B_1, B_2, \ldots, B_m)$ so that $x=x_1B_1+x_2B_2+\ldots x_mB_m$ as a field element. Then $Hf(x)=Hf(x_1B_1+x_2B_2+\ldots x_mB_m)=x_1Hf(B_1)+x_2Hf(B_2)+\ldots +x_mHf(B_m)$ since the trace function is linear and each $x_i$ is either 0 or 1. The predetermined matrix is determined by evaluating the half traces corresponding to each basis element. For example, $M=(Hf(B_1), Hf(B_2), \ldots, Hf(B_m))$. Then $Hf(x)=xM$, that is the product of x and the predetermined vector M. Each column of the predetermined matrix is the half-trace of the corresponding basis element, which is itself a field element represented as a vector.

If normal basis representation is used, at least internally for computation purposes, then both the trace and half-trace functions can be computed even more efficiently than all the methods above, because all that is required is some cyclic shifting of registers and some exclusive-ors. In the normal basis representation, squaring is essentially free since it requires only cyclic shifting of registers. The terms in the definition of the trace function can therefore be easily determined. Combining them requires only exclusive-ors.

Other cofactors are not generally recommended, but nevertheless might be used for some particular reasons. The methods of present invention can be generalized for other cofactors, and are not limited to binary fields. The essential idea is first to determine the polynomial equation in u such that $P=(u, v)$ is such that $h\ P=Q=(x, y)$. The theory of such polynomials is well known, and these polynomials are called division polynomials. Typically, it may be arranged so that the coefficients of the polynomial in u depend on the coefficient x. The next step is to determine criteria on the coefficients for whether the polynomial has a solution for u in the desired finite field. The theory of such criteria is fairly well known, and especially well known for low-degree polynomials. The degree of the polynomial depends on h, and the smaller h the smaller the degree. Typically, the smaller the degree of the polynomial the easier it is to determine if a solution exists. If h is composite, it may also be necessary to check if there exists points R such that $dR=Q$ for each proper factor d of h. A special case is for h a power of two, which includes the two specific cases discussed. In this case, one repeatedly halves Q until no further halving is possible or until a point P such $hP=Q$ is found. Each halving step involves solving a quadratic, which is accomplished by using the half-trace function for binary fields, and various techniques for prime fields, which in certain cases simplifies to finite field exponentiation. If the curve has a cyclic group structure of order h n where n is prime, then the solution P will be found if and only Q has order n or 1.

Although the invention has been described with reference to certain specific embodiments, various modifications thereof will be apparent to those skilled in the art without departing from the spirit and scope of the invention as outlined in the claims appended hereto.

The invention claimed is:

1. A method of validating a public key in an elliptic curve cryptosystem using an elliptic curve over a finite field, the public key comprising two coordinates (x,y) where x and y are elements of said finite field, said elliptic curve having cofactor h and said finite field being a binary field, said method comprising the steps of:
   a) receiving the public key;
   b) applying a function to the public key to obtain a result, the function being an algebraic expression and having for each order of the elliptic curve a predefined value for points on the elliptic curve of that order, whereby a characteristic of the public key is verifiable based on the order of the result;
   c) comparing the result of the function to predetermined information to determine the acceptability of the order of the result in order to determine the validity of the public key; and
   d) partially validating said public key if the order of the result is acceptable.

2. A method according to claim 1 wherein said elliptic curve has cofactor h=2.

3. A method according to claim 1 wherein said algebraic expression is the trace of said coordinate x and said predefined value is 1.

4. A method according to claim 3 wherein evaluating said trace comprises evaluating a dot product of said coordinate x with a predetermined vector.

5. A method according to claim 1 wherein said elliptic curve has cofactor h=4, said finite field has an odd exponent, said predetermined information is 0, and said method further comprises: evaluating a trace of the x-coordinate, confirming that said trace is zero, and confirming that said x-coordinate is not zero.

6. A method according to claim 5 wherein evaluating said trace includes evaluating a dot product of x with a predetermined vector.

7. A method according to claim 6 wherein said algebraic expression is $Tr(xHf(b/x^2))$.

8. A method according to claim 7 wherein evaluating said algebraic expression comprises the steps of: finding the square of the x-coordinate; finding the ratio of the second coefficient of said elliptic curve with said square; finding the half-trace of said ratio; finding the product of said half-trace with said x-coordinate and finding the trace of said product.

9. A method according to claim 8 wherein evaluating said trace of said product and said trace of said x-coordinate comprises evaluating a dot product of x with a predetermined vector.

10. A method according to claim 8 wherein evaluating said half-trace includes evaluating the matrix product of x with a predetermined matrix.

11. A method according to claim 10 wherein evaluating said trace of said product and said of said x-coordinate includes evaluating a dot product of x with a predetermined vector.

12. A method of validating a point on an elliptic curve with a known cofactor, comprising the steps of:
   a) determining factors of said cofactor;
   b) determining the possibility of scalar division of said point by each of said factors; and
   c) rejecting said point if any of said scalar divisions is not possible.

13. A method according to claim 12 wherein said possibility is determined by determining if a polynomial related to the division polynomial corresponding to said factor has a root.

14. A method of nearly fully validating a point on an elliptic curve with a given cofactor comprising the steps of:
   a) partially validating said point;
   b) finding the scalar multiple of said point to said cofactor; and
   c) accepting said point if said point is partially valid and said scalar multiple is the zero element of said elliptic curve.

15. A method of nearly fully validating a point on an elliptic curve with a known cofactor comprising the steps of:
   a) partially validating said point; and
   b) confirming that said point does not equal each member of a set of predetermined points.

16. A method according to claim 15 wherein said set of predetermined points is the set of points with order dividing said cofactor.

17. A method of validating a point on an elliptic curve defined over a finite field and with order an odd prime times a power of two comprising the steps of:
   a) partially validating said point;
   b) attempting to halve said point repeatedly until
      i. no half is found, or
      ii. the number of times said point is halved is the exponent of two in said power of two; and
   c) accepting said point if said point is partially valid and said number of times is equal to said exponent.

* * * * *